Oct. 5, 1965 L. A. PIETERS 3,210,470

TELEVISION APPARATUS

Filed April 2, 1962 3 Sheets-Sheet 1

Inventor
LEON ANDRE PIETERS
By
Mead, Browne, Schuyler & Beveridge
Attorneys

Inventor
LEON ANDRE PIETERS
By Mead, Browne, Schuyler + Beveridge
Attorney

Inventor
LEON ANDRE PIETERS
By Mead, Browne, Schuyler & Beveridge
Attorney

United States Patent Office 3,210,470
Patented Oct. 5, 1965

3,210,470
TELEVISION APPARATUS

Leon Andre Pieters, Cambridge, England, assignor to Pye Limited, Cambridge, England Filed Apr. 2, 1962, Ser. No. 184,440
Claims priority, application Great Britain, Apr. 6, 1961, 12,174/61
3 Claims. (Cl. 178—69.5)

Figure 1:
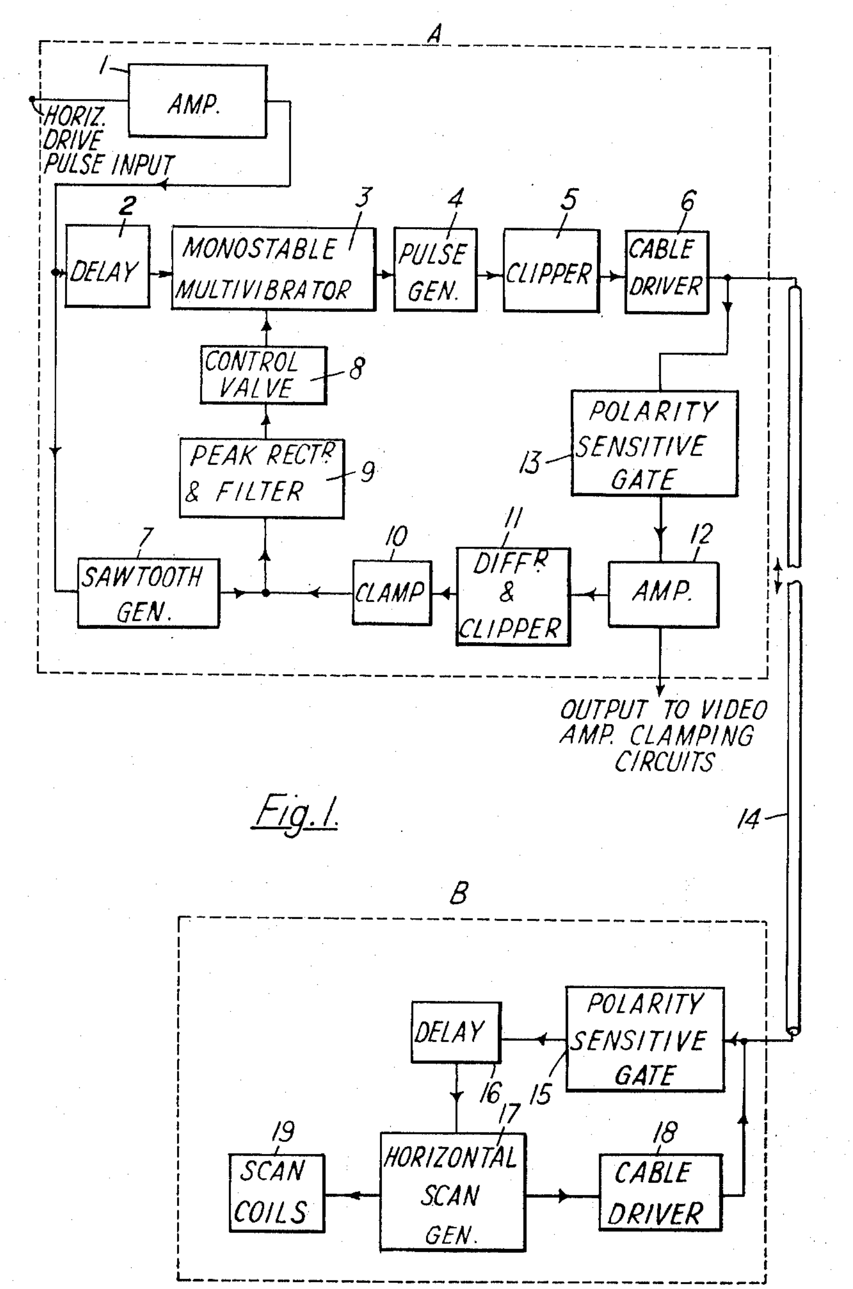

The present invention relates to television apparatus for use with a synchronising pulse generator and a camera for the production of television signals. In a television system it is essential that the different parts of the system operate accurately in step if the picture is to be reproduced successfully. This is achieved by the presence of synchronising signals in the waveform, derived from a synchronising pulse generator which usually also produces blanking pulses and driving pulses. The synchronising and blanking pulses are used in producing the final complete television waveform and appear as part of that waveform. The driving pulses are employed in the camera and control unit circuits, as well as for driving scanning circuits, clamp pulse generators, etc. in the associated equipment. The driving pulses may be coincident with the synchronising pulses or may be advanced with respect thereto. For example, in the British 405 line television system as at present employed, the leading edge of the horizontal driving pulses is 4 $\mu$S. in advance of the leading edge of the horizontal synchronising pulses. These driving pulses are fed to the camera or each camera of the system via a cable, in order to drive the scanning generator associated with the camera pick-up tube, and the resulting video signal derived from the camera output is sent via another cable, or other conductors of the same cable, back to the control equipment where it is usually combined with the synchronising and blanking pulses to produce the complete waveform for transmission or other purposes. When the drive pulse is sent to a camera via a cable it suffers an appreciable delay due to the propagation time along the cable, and the resulting video signal suffers a similar delay in the return cable. The total effective delay is thus equal to the delay of a length of cable twice that of the cable feeding the drive pulses to the camera, and for the usual coaxial cable has an approximate value of 3.2 $\mu$S. for 1,000 feet of camera cable.

The scan fly-back time of the camera must be such that the ensuing line of video signal is commenced at the end of the horizontal blanking period in the television waveform and this period is very limited, being in the range of 10–20 $\mu$S. depending on the system in use. The delay in the cable reduces the time available for fly-back during the blanking period, and as very fast fly-back times are uneconomical the length of camera cable that may be used is restricted and in some systems it cannot exceed 1,200 feet.

It is an object of this invention to overcome the problems, whereby any desired length of camera cable can be used, within practical limits, without requiring an excessively rapid fly-back time, and at the same time ensuring that the video signal arriving at the camera control unit is correctly timed with respect to the blanking period, whatever may be the length of cable in use.

According to the present invention the horizontal scanning generator for the pick-up tube in a camera is driven by an auxiliary pulse train of small mark to space ratio, derived from a monostable multivibrator whose triggering is controlled so as automatically to compensate for delay introduced by the camera cable, whose length may vary within wide limits, and without the necessity of making the fly-back period of the synchronising waveform uneconomically short.

Figure 2:
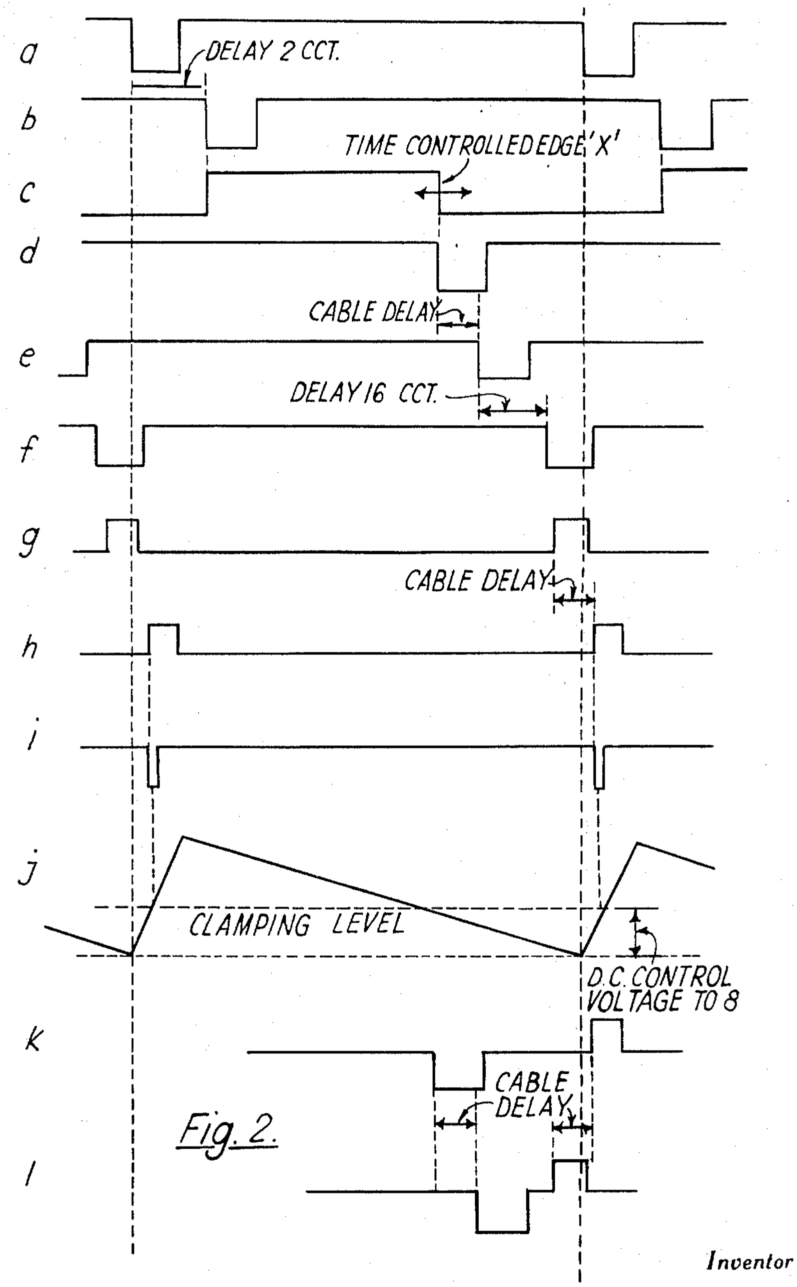
Figure 3:
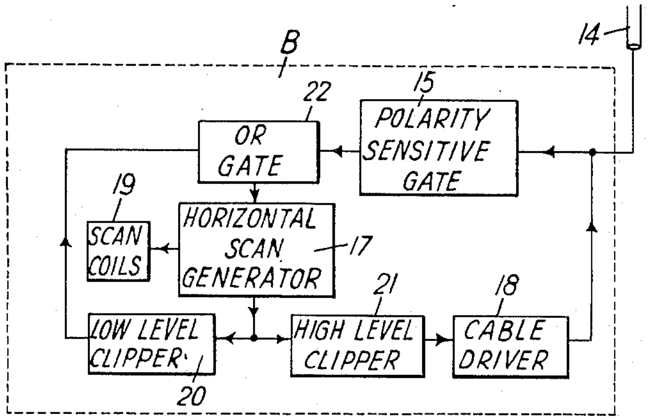
Figure 4:
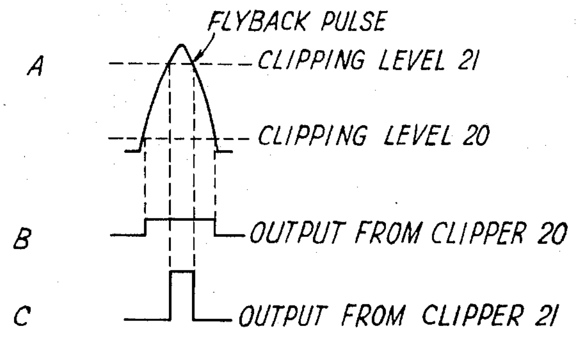

The invention will now be further described with reference to the accompanying drawings, in which:

FIGURE 1 is a block schematic diagram showing one embodiment of the television apparatus according to this invention, FIGURE 2 shows explanatory waveforms. FIGURE 3 is a modification of FIGURE 1, and FIG. 4 is a set of curves used to explain the operation of FIG. 3.

Referring to FIGURE 1, block A represents the control circuit that is located in the camera control unit, and block B represents the associated circuit in the camera. Horizontal driving pulses from the synchronising pulse generator are fed to an amplifier 1, and the output waveform (FIGURE 2*a*) is fed to a delay circuit 2 and a sawtooth generator 7. The purpose of the delay circuit 2 will be described later. The delayed horizontal driving pulses (FIGURE 2*b*) are fed to a monostable multivibrator 3 which provides an adjustable delay period, the return of this multivibrator to the stable state being controlled by a D.C. potential from the control valve 8 to form a time-controlled edge (X in FIGURE 2*c*). This time-controlled edge drives a pulse generator 4 which in turn produces the auxiliary pulse train used to drive the scan generator in the camera. This pulse is shaped in a clipper 5 and fed to the cable via a cable drive amplifier 6 (FIGURE 2*d*). After suffering a delay (as shown in FIGURE 2*e*) whilst passing along the cable 14 to the camera circuit B, this pulse is passed through a polarity sensitive gate 15 to a further fixed delay circuit 16, and then to the horizontal scan generator 17 where the leading edge (FIGURE 2*f*) drives the generator 17 to produce the desired waveform in the scanning coils 19. The purpose of the delay circuit 16 will also be explained later.

An output is derived from the fly-back pulses of the scan generator 17. This output is approximately sinusoidal and by clipping it near to the tip a relatively narrow pulse centred on the fly-back period is derived. This pulse (FIGURE 2*g*) is fed via a cable driver amplifier 18 (FIGURE 2*g*) to the cable 14 with a polarity opposite to that of the incoming auxiliary driving pulse train, and is therefore unable to pass gate 15, but is transmitted via the cable, suffering a further delay, to arrive at the control circuit A, where it is passed by the polarity sensitive gate 13 (FIGURE 2*h*). The video signal from the camera B has to pass along a separate cable of comparable length to that of cable 14 and therefore it is delayed by a similar amount.

The output pulse from gate 13 is then fed to an amplifier 12 and used to generate a very narrow pulse by differentiation and clipping in the circuit 11 (FIGURE 2*i*). This narrow pulse is then fed to clamp circuit 10 which clamps the sawtooth waveform produced by generator 7. The peak of the clamped sawtooth waveform (FIGURE 2*j*) is rectified and filtered in stage 9 and the resulting D.C. voltage is applied to the control valve 8 to determine the instant at which the monostable multivibrator 3 returns to its stable condition.

If the length of cable 14 is altered, then the delay incurred on each traverse of the cable by the auxiliary pulse and the return pulse will be changed. The point at which the sawtooth waveform is clamped will also change, so causing a change in the D.C. condition and altering the delay generated by multivibrator 3, to correct the position of the auxiliary driving pulses and so ensure that the video signal received from the camera at the camera control unit A has a constant time relationship to the driving pulses from the synchronising pulse generator regardless (within practical limits) of the length of cable connecting the camera and camera control unit. Due to this self-correcting action, any drift in the multivibrator circuit 3 is also automatically compensated.

As the length of cable 14 is shortened the position of time controlled edge "X" (FIGURE 2*c*) will approach the commencement of the next horizontal driving pulse, and will actually fall after the commencement of the next horizontal driving pulse when the cable length is especially short. If under the latter condition the monostable multivibrator 3 was triggered directly by the horizontal driving pulses, then the multivibrator would not have returned to its stable state before an attempt was made to re-trigger it. By delaying the horizontal driving pulses by delay circuit 2, the multivibrator 3 is able to return to its stable state before a horizontal pulse appears to trigger it into its other condition.

The delay 16 in the camera circuit is necessary if the single cable 14 is to be used for the auxiliary driving pulses and the return pulses, as these must never coincide on a single cable. By using this delay the pulses are disposed at the inputs of gates 13 and 15 as shown respectively in FIGURES 2*k* and 2*f*. If a separate cable can be used for the return pulse path then the polarity sensitive gates 13 and 15 and delay 16 are not required.

The output from amplifier 12 is suitable for use as a keying waveform for clamping circuits in the associated video channel.

If the pulse generated by 4 in FIGURE 1 is arranged to be of very short duration, say in the order of 1 μs., we can provide a modification in the camera circuit. Such a modification is shown in FIGURE 3. No delay device 16 is used and the short pulse arriving in B is fed to a polarity sensitive device and thence to an "or gate" which feeds a horizontal scan generator 17 which as before provides the horizontal scan waveform for the camera tube scan coils 19. The output from 17 during the fly-back period is fed to two clipping stages 20 and 21. As is shown in FIGURE 4 at A the clipper 20 operates at very low amplitude and gives a wide output pulse 4B comparable in width with that of the fly-back pulse itself. This wide pulse is fed to the input of generator 17 through the gate 22 and serves to prolong the period of time during which the generator 17 is held in the condition required for fly-back. This is provided, as the generator circuits could not be re-triggered within the short duration of the driving pulse received via cable 14.

The second clipping stage 21 operates at a level near the peak of the fly-back pulse and produces a much narrower pulse, 4C, centred on the fly-back period. This pulse is fed to the cable driver 18 and thence via the cable 14 to the control unit A as previously described. The pulse fed down the cable from the generator 4 is shorter than the time-lapse between the beginning of the fly-back pulse and the beginning of the pulse 4C, which is fed to the cable and therefore there is no possibility of overlap of the pulses in the cable. With this embodiment also the delay provided by 2 of FIGURE 1 can be appreciably reduced because of the shorter duration of the pulse (about 1 μs.) produced from the time-controlled edge X of the waveform at the output of the multivibrator 3. This short pulse allows more time for the multivibrator circuits to be reconditioned, even when very short cable-lengths are used.

Whilst a particular embodiment has been described it will be understood that various modifications may be made without departing from the scope of this invention.

I claim:

1. In apparatus for the synchronising of television camera control signals, a remote control unit having a terminal adapted to receive input pulses from a master synchronising pulse generator, a monostable multivibrator operatively connected to said terminal so as to be triggered by said input pulses, means for producing from said pulses a reference waveform, a cable connecting said remote control unit with a camera unit, means operable from said multivibrator for producing a train of auxiliary driving pulses, means for feeding said driving pulses to said cable, means at said camera unit for causing each of the said driving pulses to operate a horizontal scan generator, means for deriving from the horizontal scan generator return pulses, each corresponding with one of said driving pulses, whose time of occurrence depends on the delay in the cable, means for transmitting the return pulses to the cable, means at the remote control unit for deriving a regulating potential by a phase comparison of the reference waveform and each pulse of the returned pulse train, means for causing said regulating potential to control the return stroke of the multivibrator and means for delaying the master synchronising pulse in the input of the multivibrator to ensure that the monostable multivibrator has returned to its stable state before the occurrence in its input circuit of each triggering pulse from the master synchronising generator.

2. Apparatus according to claim 1 comprising means at the camera unit for sensing the polarity of each auxiliary driving pulse received thereat, means for causing correctly polarised auxiliary driving pulses to operate the horizontal scan generator at the camera unit and means for transmitting the return pulse train to the cable out of phase with the auxiliary driving pulse train.

3. Apparatus according to claim 1 wherein the means for producing said reference waveform is a saw-tooth generator whose clamping voltage is determined by a phase comparison with the said return pulses at the remote control unit.

References Cited by the Examiner

UNITED STATES PATENTS

| | | | |
|---|---|---|---|
| 2,278,788 | 4/42 | Knick | 178—69.5 |
| 2,556,933 | 6/51 | Mulligan | 178—69.5 |
| 2,556,934 | 6/51 | Mulligan | 328—177 |
| 2,704,307 | 3/55 | Gillette et al. | 178—69.5 |
| 2,764,686 | 9/56 | Luther | 178—69.5 |

DAVID G. REDINBAUGH, *Primary Examiner.*